United States Patent Office 3,125,005
Patented Mar. 17, 1964

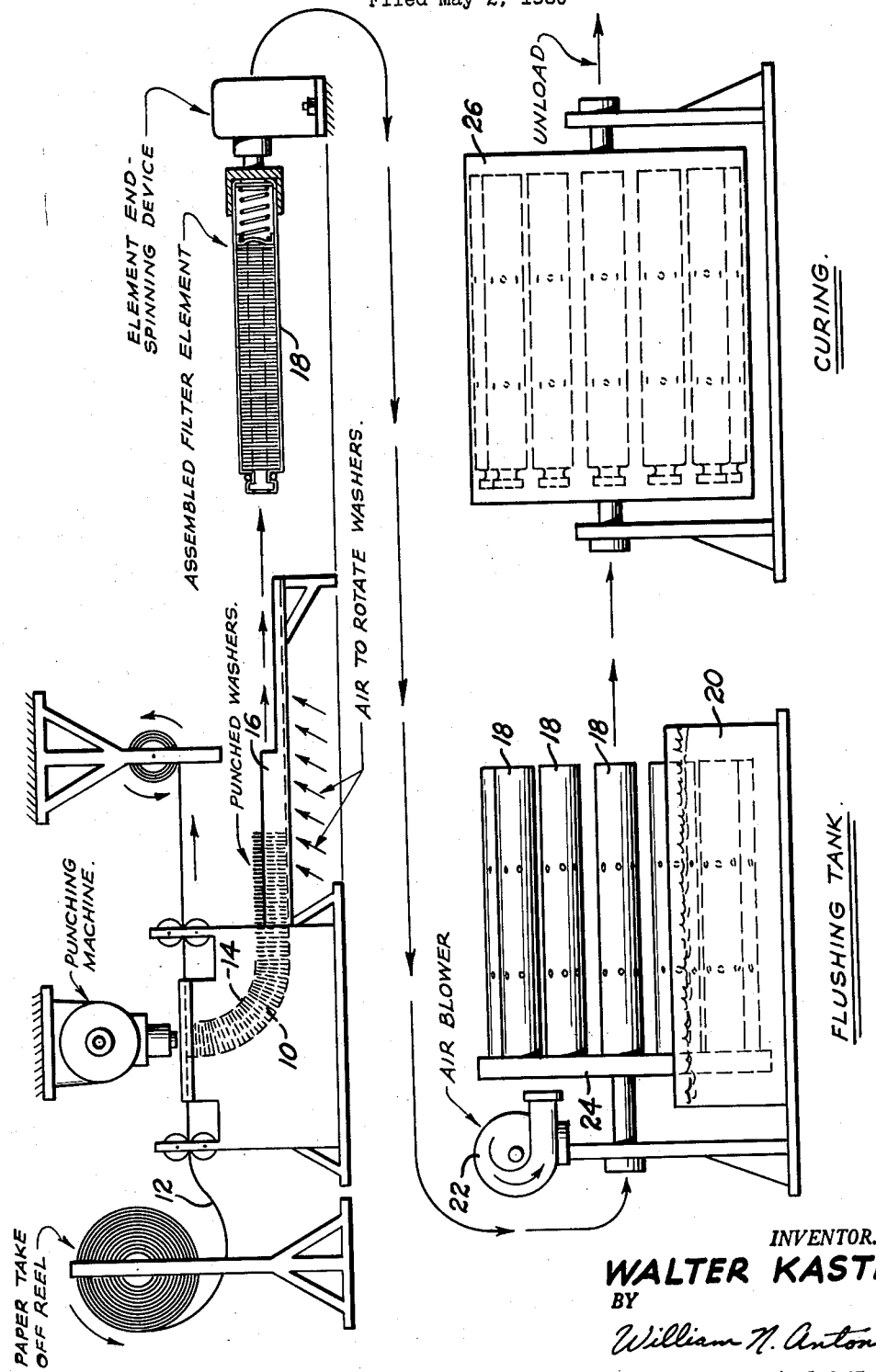

3,125,005
PROCESS FOR MAKING AND TREATING EDGE TYPE ELEMENTS
Walter Kasten, Madison Heights, Mich., assignor to The Bendix Corporation, a corporation of Delaware
Filed May 2, 1960, Ser. No. 25,906
1 Claim. (Cl. 93—1)

This invention relates to resin impregnated edge type elements, such as the washer type, wherein flow takes place through the spaces formed between adjacent contacting washers rather than through the material of the washers, and more particularly to novel improvements in the fabrication and treatment of such elements.

In the past manufacturers of such elements have purchased sheets of raw paper having the desired surface properties and have then had it processed and treated through special machinery and equipment to impregnate the sheet with the necessary resin content. In order to prevent the paper from becoming so brittle that it could not be subsequently processed through washer punching machinery, only some of the solvents used during impregnation were dried out. The rolls of paper were then wrapped in an uncured state in vapor-barriers and were stored in air-conditioned low temperature storage rooms unless they were intended for immediate use. Rolls left out in the open tend to dry out and cannot be processed in subsequent operations.

When the rolls were ready to be used, the sheets were slit to the desired widths to fit the punching presses and washers were punched therefrom. The washers were then placed on metal mandrels and stacked on a rack. This rack was then immersed in hot oil which effected the curing of the resin in the paper. After the curing process, the oil was blown out and the washers were then assembled onto springs, rods or other means to form completed elements. An alternate method used for curing these elements was to stack the washers on a rod which was then placed in an oven for a predetermined time interval and at a predetermined temperature.

One of the drawbacks, however, of such a process is the fact that washers punched out of such resin impregnated paper have exposed untreated surfaces, namely, those surfaces on the inner and outer diameters of the washers. Furthermore, during all of these processing and assembling operations, a large amount of contamination is assembled with the element. In order to prevent this contamination from being discharged into the effluent after the element is sold and used, each of the elements must be flushed with a cleaning solvent which will wash out any loose particles that have been assembled with the element.

With these thoughts in mind, it is an object of this invention to provide an improved process for making resin impregnated washer type elements the use of which will result in elements being more uniformly impregnated with resin than are similar elements fabricated by processes other than the one to be described and claimed.

Another object of this invention is to provide an improved simplified process for making resin impregnated washer type elements which will substantially reduce material and handling costs.

Another object of this invention is to provide a simple unique process for making resin impregnated washer type elements which will give greater flexibility in fabricating elements, which ultimately have different resin contents, out of the same basic untreated material.

To obtain these and other desired objects and advantages the following unique inventive process is proposed for making resin impregnated washer type elements.

Referring to the accompanying drawing, which schematically illustrates the inventive process, washers 10 are punched out of a raw unimpregnated crepe paper strip 12. These washers, without any further processing, are passed through a tube 14 and into a trough 16 from whence they are assembled in registered face to face contact to form elements, such as 18, of predetermined sizes. Instead of flushing the elements with a cleaning solvent, the flushing is done with a resinous solution 20 of a concentration sufficient to impregnate the washers of the element with the desired resin content. After the resin flushing operation, the excess solution is removed by draining and/or blowing air through the elements by means such as an air blower 22. These steps may be accomplished by placing a plurality of elements 18 each equidistant from the periphery of a circular rotatable collar 24 so that the elements will be sequentially flushed and subjected to the air blower. The completed filter 18 is then cured by placing it in an oven 26 at the desired temperature for a predetermined interval of time, by blowing hot air through it, or by any other suitable method.

When the washers are punched out of crepe paper it is often undesirable, depending on the ultimate use of the element, to permit the crepe paper ridges on the face of the washers to become aligned with the ridges on the next adjacent washer and to nest therewith. Such nested washers often provide too high a restriction to flow for many purposes. For this reason, it is necessary to rotate the washers after punching, so that the crepe ridges of each two adjoining washers are at an angle to each other. This may be accomplished by placing the washers loosely on a member and then blowing compressed air tangentially to said washers. This tends to cause a degree of relative rotation between the washers and prevents most of the washers from nesting. In this manner greater resiliency is built into a given element.

Fabrication of resin impregnated washer type elements in accordance with my unique above described process has the following advantages:

(a) Handling and labor costs are reduced by about 50%.

(b) The manufacturer may resin impregnate his elements without the use of expensive elaborate equipment.

(c) There is approximately a 50% saving in actual resin cost, since it is only necessary to treat the element washers used and not also treat the slugs and the exterior scrap left over from the paper from which the washers are punched.

(d) There are no exposed untreated edges or surfaces in the elements. In previous processes where the paper was resin treated prior to punching, the inner and outer edges of the washers were exposed after the die cutting.

(e) Extra cleaning operations can be eliminated since the flushing can be combined with the resin treatment.

(f) Any loose particles, which are not flushed out, are bonded by the resin treatment to the element and there is less likelihood of possible fiber migration.

(g) No air conditioned room is required for storing the resin treated paper prior to forming the elements.

(h) The die life of the punches is extended, since only plain untreated paper has to be cut.

(i) The amount of resin impregnation can be varied to suit each specific purpose.

(j) The percent of resin treatment required to get the same effect is reduced. Since there are no cut edges exposed, the same degree of water-proofing can be accomplished with a much lower resin content than could formerly be accomplished with a large amount of resin.

Those acquainted with this art will readily understand that the invention herein set forth is not necessarily limited and restricted to the precise and exact details presented and that various changes and modifications may be resorted to without departure from the invention as defined by the appended claim.

Having thus described the various features and advantages of my invention, what I claim as new and desire to secure by Letters Patent is:

A process for making a resin impregnated washer type element in which fluid is filtered by flowing through spaces formed between adjacent contacting washers comprising the steps of punching uniform size washers out of raw unimpregnated crepe paper, aligning said washers to form a substantially cylindrical element of predetermined length, said alignment of said washers including the steps of placing said washers loosely on a member and blowing compressed air tangentially to said washers to cause a degree of relative rotation therebetween so as to cause the ridges found on the faces of said crepe paper washers to normally be at an angle with respect to the ridges of the next adjacent washers, flushing a resinous solution through said element to uniformly impregnate said paper washers with a predetermined resin content, blowing air through said element to assist in draining off any excess solution, and heating said element to cure the resin impregnated therein.

References Cited in the file of this patent
UNITED STATES PATENTS

| | | |
|---|---|---|
| 2,177,323 | Kirkendall | Oct. 24, 1939 |
| 2,731,152 | Redner | Jan. 17, 1956 |
| 2,769,741 | Schwartz | Nov. 6, 1956 |
| 2,792,766 | Dubuc | May 21, 1957 |
| 2,859,482 | Warren et al. | Nov. 11, 1958 |